(12) United States Patent
Zhang (10) Patent No.: US 10,516,903 B2
(45) Date of Patent: Dec. 24, 2019

(54) METHOD AND APPARATUS FOR TRANSMITTING VIDEO DATA (71) Applicant: ALIBABA GROUP HOLDING LIMITED, George Town, Grand Cayman (KY)

(72) Inventor: Yayu Zhang, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 171 days.

(21) Appl. No.: 15/364,829

(22) Filed: Nov. 30, 2016

(65) Prior Publication Data

US 2017/0155937 A1    Jun. 1, 2017

(30) Foreign Application Priority Data

Dec. 1, 2015    (CN) .......................... 2015 1 0867370

(51) Int. Cl.
*H01L 29/06* (2006.01)
*H04N 21/2343* (2011.01)
(Continued)

(52) U.S. Cl.
CPC ..... *H04N 21/234381* (2013.01); *H04L 63/10* (2013.01); *H04L 67/10* (2013.01);
(Continued)

(58) Field of Classification Search
CPC ......... H04L 63/08; H04L 63/10; H04L 67/42; H04N 21/2396; H04N 21/25816; H04N 21/64769; H04N 21/234381
(Continued)

(56) References Cited

U.S. PATENT DOCUMENTS 5,987,504 A * 11/1999 Toga .................. H04L 29/06
709/203
7,617,515 B1 * 11/2009 Laksono ............ H04L 47/781
709/226
(Continued)

FOREIGN PATENT DOCUMENTS

CN    101127878 A    2/2008
CN    101287003 A    10/2008
(Continued)

OTHER PUBLICATIONS

PCT International Search Report and Written Opinion dated Feb. 28, 2017, issued in corresponding International Application No. PCT/US2016/064155 (15 pages).
(Continued)

*Primary Examiner* — Hosuk Song
(74) *Attorney, Agent, or Firm* — Finnegan, Henderson, Farabow, Garrett & Dunner, LLP (57) ABSTRACT

A method for transmitting video over a network is disclosed. The method may be implemented by a processor and a non-transitory computer-readable storage medium storing instructions. The method may comprise: receiving, from a video data source, video data; generating a set of images from the video data based on a conversion rule that corresponds to a predetermined playback video quality; and transmitting, over a network to a client device, the set of images for rendering and displaying on a browser installed on the client device.

14 Claims, 6 Drawing Sheets

(51) Int. Cl.
*H04L 29/06* (2006.01)
*H04L 29/08* (2006.01)
*H04N 21/239* (2011.01)
*H04N 21/258* (2011.01)
*H04N 21/647* (2011.01)

(52) U.S. Cl.
CPC .......... *H04L 67/2823* (2013.01); *H04L 67/42* (2013.01); *H04L 69/08* (2013.01); *H04L 63/08* (2013.01); *H04N 21/2396* (2013.01); *H04N 21/25816* (2013.01); *H04N 21/64769* (2013.01)

(58) Field of Classification Search
USPC .............................. 726/2–7, 26–30; 713/168
See application file for complete search history.

(56) References Cited

U.S. PATENT DOCUMENTS

| | | | | |
|---|---|---|---|---|
| 7,984,487 | B2* | 7/2011 | Katsube | H04L 63/08 726/5 |
| 9,137,567 | B2* | 9/2015 | Vestergaard | G06F 3/14 |
| 9,143,826 | B2* | 9/2015 | Vestergaard | G06F 3/14 |
| 9,277,237 | B2* | 3/2016 | Abiezzi | H04N 19/51 |
| 2007/0245386 | A1 | 10/2007 | Morley et al. | |
| 2009/0133113 | A1 | 5/2009 | Schneider | |
| 2013/0282400 | A1 | 10/2013 | Al-Moosawi | |
| 2014/0129825 | A1 | 5/2014 | Losev et al. | |
| 2015/0020135 | A1 | 1/2015 | Frusina et al. | |
| 2015/0046965 | A1 | 2/2015 | Shanson | |
| 2015/0341407 | A1 | 11/2015 | Agnoli et al. | |

FOREIGN PATENT DOCUMENTS

| | | |
|---|---|---|
| CN | 102231863 A | 11/2011 |
| CN | 102420897 A | 4/2012 |
| CN | 102547269 A | 7/2012 |
| CN | 102905102 A | 1/2013 |
| WO | WO-2017/095885 A1 | 6/2017 |

OTHER PUBLICATIONS

Extended European Search Report pursuant to Rule 62 EPC, the Supplementary European Search Report (Art. 153(7) EPC) and the European Search Opinion for European Application No. EP 16871397. 2, dated Aug. 10, 2018 (7 pages).

First Chinese Search Report Issued by the State Intellectual Property Office of People's Republic of China in corresponding Chinese Application No. 201510867370.X, dated Jun. 28, 2019. (2 pages).

First Chinese Office Action Issued by the State Intellectual Property Office of People's Republic of China in corresponding Chinese Application No. 201510867370.X, dated Jul. 10, 2019 (10 pages).

* cited by examiner

METHOD AND APPARATUS FOR TRANSMITTING VIDEO DATA

CROSS-REFERENCE TO RELATED APPLICATION

This application is based upon and claims priority to Chinese Patent Application No. 201510867370.X, filed Dec. 1, 2015, the entire contents of which are incorporated herein by reference.

TECHNICAL FIELD

The present disclosure generally relates to the field of computer technology and, more particularly, to a method and an apparatus for transmitting video data.

BACKGROUND

With the advance of Internet technology, there has been rapid development in technologies for various modes of network transmission of multimedia data, such as streaming, which allows a receiving device to play the multimedia data (e.g., a video clip, an audio clip, etc.) as soon as the device receives part of the data over the network.

Figure 1:
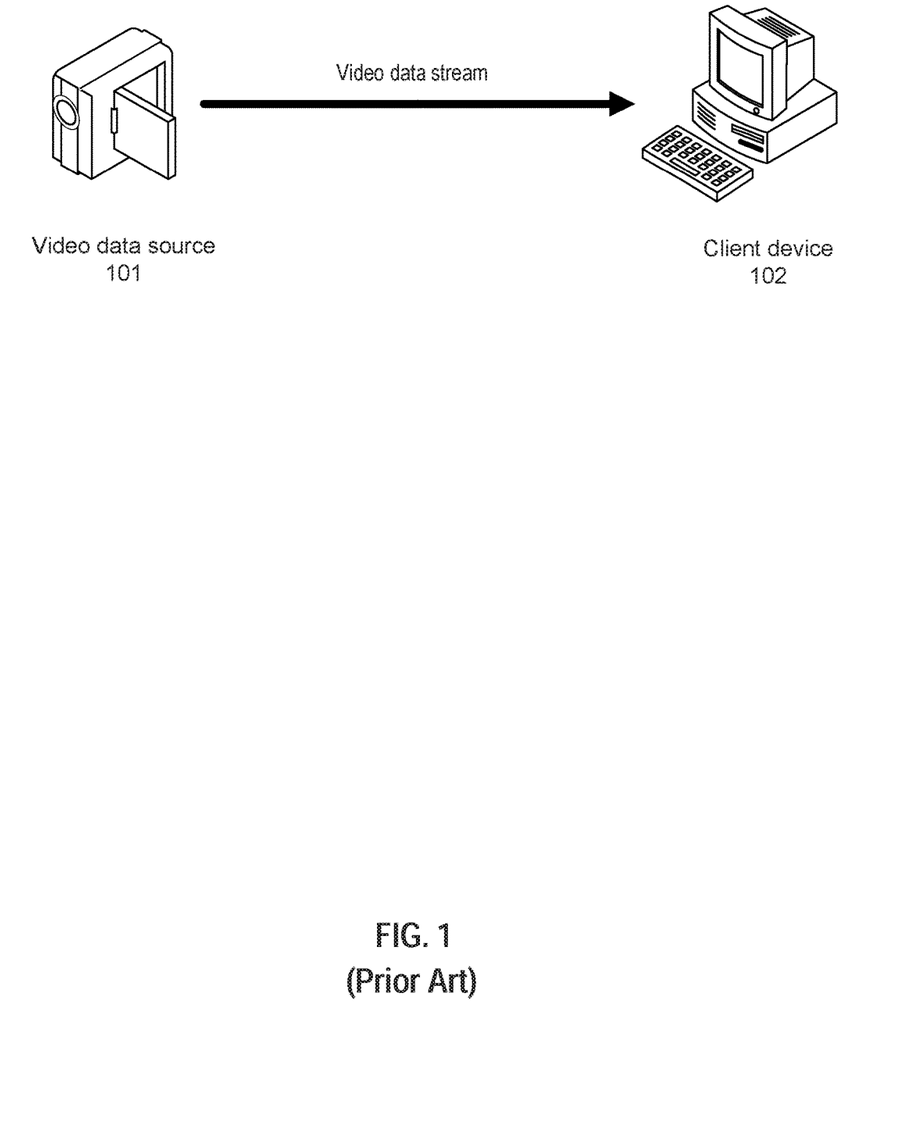
FIG. 1 is a block diagram illustrating a conventional method of transmission of video data.

With current technologies, a client device (e.g., a personal computer, a mobile device such as smart phone, tablets, or any portable devices, etc.) can receive, from a data source, a stream of multimedia data (e.g., video data, audio data, etc.). The client device can then decode the multimedia data, and play the decoded data. FIG. 1 illustrates an example of transmission of a video data stream from a video data source 101 to a client device 102.

The reception, decoding, and playing of multimedia data can be performed by dedicated software application, or by a browser (with a third-party plug-in such as Adobe™ Flash Player, JavaScript version of FFmpeg, etc.) installed on the client device. Both approaches have limitations. For example, multiple versions of the dedicated software application may be needed to adapt to operate on different platforms, such as Mac™, Windows™, Linux, iOS™, Android™, and WinPhone™, depending on whether the client device is a personal computer or a smart phone. Also, there can be compatibility and performance problems with third-party plug-ins. For example, Adobe™ Flash Player is not supported by iOS™, and these plug-ins may be not optimized for operation on a mobile device, leading to excessive power consumption. Further, even if the plug-in is supported across different platforms, the browser may become the bottleneck. For example, if the browser does not support high-definition videos, or that it does not support playing of multiple video data streams (e.g., for a real-time monitoring system), the client device will not be able to provide such functionalities.

Moreover, the processing of the multimedia data typically consumes a large amount of CPU and memory resources, which makes it difficult, if not impossible, for a mobile device to support processing of high-definition videos and playing of multiple video data streams.

Therefore, there is a need for a system that allows real-time acquisition, processing, and rendering of video data at client devices associated with multiple platforms and that requires less computation and memory resources.

SUMMARY

One aspect of the present disclosure is directed to a method for transmitting video data over a network. The method may comprise: receiving, from a video data source, video data; generating a set of images from the video data based on a conversion rule that corresponds to a predetermined playback video quality; and transmitting, over a network to a client device, the set of images for rendering and displaying on a browser installed on the client device.

Another aspect of the present disclosure is directed to an apparatus for transmitting video data over a network. The apparatus may comprise: a receiving module configured to receive, from a video data source, video data; a conversion module configured to generate a set of images from the video data based on a conversion rule that corresponds to a predetermined playback video quality; and a transmission module configured to transmit, over a network to a client device, the set of images for rendering and displaying on a browser installed on the client device.

Another aspect of the present disclosure is directed to a non-transitory computer-readable storage medium storing one or more programs, the one or more programs comprising instructions which, when executed by a processor of a server, cause the server to perform a method for transmitting video data over a network. The method may comprise: receiving, from a video data source, video data; generating a set of images from the video data based on a conversion rule that corresponds to a predetermined playback video quality; and transmitting, over a network to a client device, the set of images for rendering and displaying on a browser installed on the client device.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only and are not restrictive of the disclosed embodiments, as claimed.

DESCRIPTION OF THE EMBODIMENTS

With current technologies (e.g., as shown in FIG. 1), where dedicated software applications or browsers with plug-ins are used to decode and play multimedia data, there exist various problems. For example, different versions of dedicated software applications are needed to operate on different platforms. Moreover, the processing of multimedia data consumes a large amount of CPU and memory resources, which makes it difficult, if not impossible, for a mobile device to support processing of high-definition videos and playing of multiple video data streams, thereby severely degrading the user experience.

Embodiments of the present disclosure provide a system of transmitting video data based on transmission of decoded images. Given that image-rendering is a basic functionality of a browser, by transmitting decoded images data instead of encoded video data, any recipient device with a browser will be able to process and render the received images. As a result, video data acquisition and playing can be performed with devices associated with different platforms or operating systems. Moreover, the processing of decoded images also requires less computation and memory resources than the processing of encoded video data stream, and can be performed more efficiently.

Reference will now be made in detail to methods and specific implementations that seek to overcome the foregoing shortcomings of current systems and methods for facilitating the login of an account. Examples of these implementations are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 2:
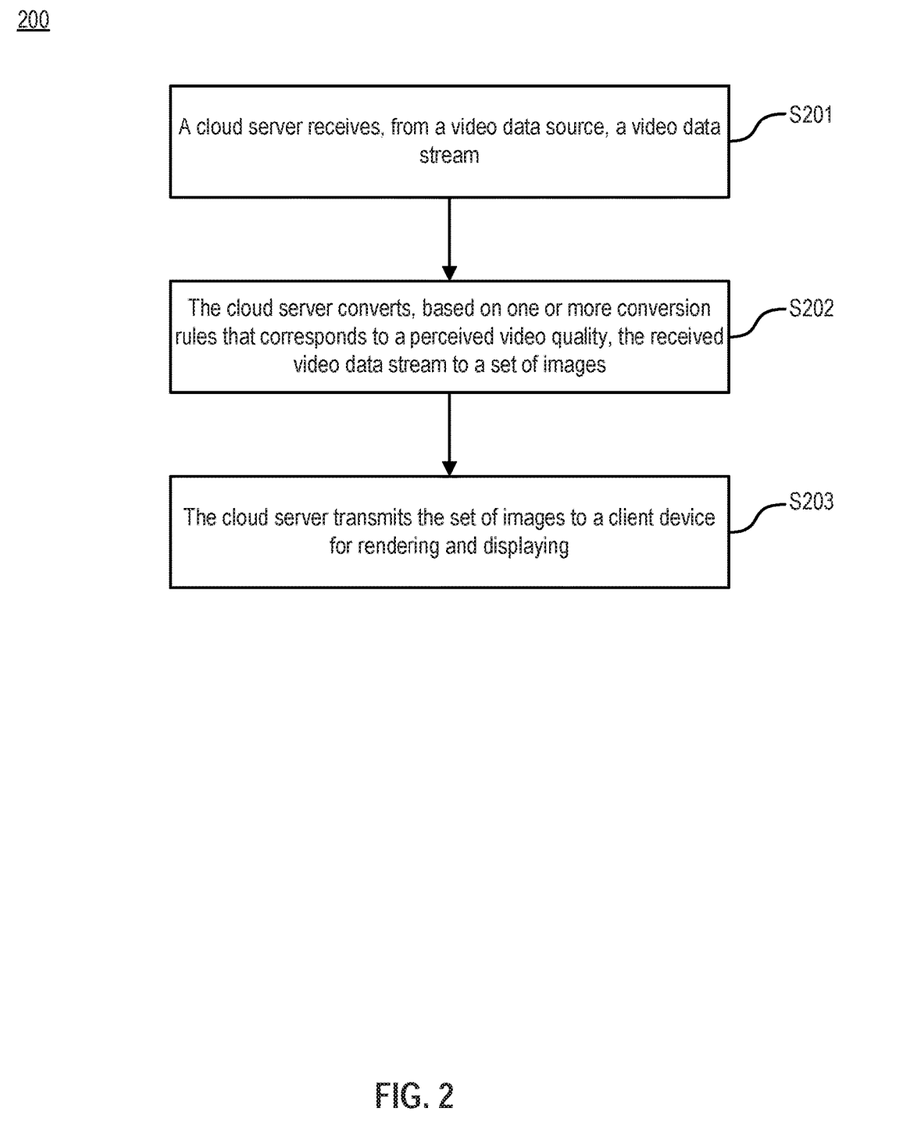
FIG. 2 is a flow chart illustrating an exemplary method for transmitting video data, consistent with embodiments of the present disclosure.

Reference is now made to FIG. 2, which illustrates an exemplary method 200 for transmitting video data, according to embodiments of the present disclosure. While the illustrated method is depicted as being performed by a cloud server, it is appreciated that the method can be performed by, for example, a video data source, a cloud server, and/or a client device. Referring to FIG. 2, method 200 includes the following steps.

In step S201, the cloud server receives, from the video data source, a video data stream.

In some embodiments, before the cloud server receives the video data stream from the video data source, the cloud server may receive a connection request from the video data source. After authenticating the video data source, the cloud server may establish a connection with the video data source. The connection between the cloud server and the video data source can also be maintained, and that the client server needs not maintain a connection with the video data source to obtain the video data.

In some embodiments, the cloud server can also receive a request for video data from the client device. After authenticating the client device, the cloud server can then transmit the request to the video data source for the requested video data. As a result, the cloud server can act as a third party authenticator to authenticate the identities of the cloud server and the client device, before granting the client device access to the video data stored at the video data source. Such an arrangement enables enforcement of access right to the video data, while reducing the likelihood that an imposter may be able to transmit malicious data to the client device.

In step S202, the cloud server converts, based on one or more conversion rules that corresponds to a playback video quality, the received video data stream to a set of images.

In some embodiments, the conversion of the video data stream can be according to one or more conversion rules, which set a number of images per unit time of the video data stream. A higher number of images per unit time can lead to better playback video quality, while a lower number of images per unit time can lead to poorer playback quality. For example, it can be predetermined that when images are displayed to human eyes at a frequency of 24 frames per second (or higher), the viewer may perceive a seamless animation of images, while if the images are displayed at a lower frequency, the viewer may instead perceive a set of still images. As a result, the cloud server may convert each second worth of video data stream into a fixed number (e.g., 24) of images, to maintain a predetermined perceived playback video quality. The number can be set higher to improve the playback quality, or lower to reduce network load.

In some embodiments, the conversion rules (and the number of images generated for each second) can be set based on a request from the client device. For example, the client device may report a requisite playback video quality to the cloud server, which can then set the conversion rule accordingly.

In some embodiments, the conversion rules may also be set based on the network load. For example, the cloud server may monitor a status of the network between the cloud server and the client device. The cloud server may determine a maximum rate of data transmission between the cloud server and the client device. Based on the data rate, the cloud server can then determine a number of images to be generated per second, to avoid overloading the network.

In some embodiments, the conversion rules can be set based on a combination of the aforementioned criteria. As an illustrative example, the cloud server may initially set the number of images per second at 24, but then increase it to 36 based on a requisite video quality reported by the client device. As another illustrative example, the cloud server may initially set the number of images per second at 36 (e.g., due to a request from the client device), but then reduce it back to 24 based on the network condition. It is understood that the conversion rules can also be set based on any other combinations of these criteria, or other suitable criteria.

In step S203, the cloud server transmits the set of images to the client device for rendering and displaying. In some embodiments, the cloud server may also acquire information about a browser installed at the client device, and configure the transmission of the images based on the information, such that the images can be rendered and displayed by the browser following a predetermined order. Further, multiple browser windows can be instantiated on the client device, and images associated with different video data streams can be transmitted and displayed in different browser windows. With such an arrangement, the client device can play multiple video data streams.

With embodiments of the present disclosure, video data are transmitted to client devices in the form of decoded images, which can be rendered and displayed by virtually any browser program. As a result, compatibility issues can be avoided, while the processing of the received images at the client device can be performed with less computation and memory resources. The transmission and processing of image data can also be configured to improve efficiency and responsiveness. For example, the cloud server can be configured to push the images to the client device as soon as they are generated, so that the client device can receive and buffer the images in advance for future rendering. Moreover, the client device does not have to perform further decoding of the images, and can process and render the images with relatively less computation and memory resources.

Figure 3:
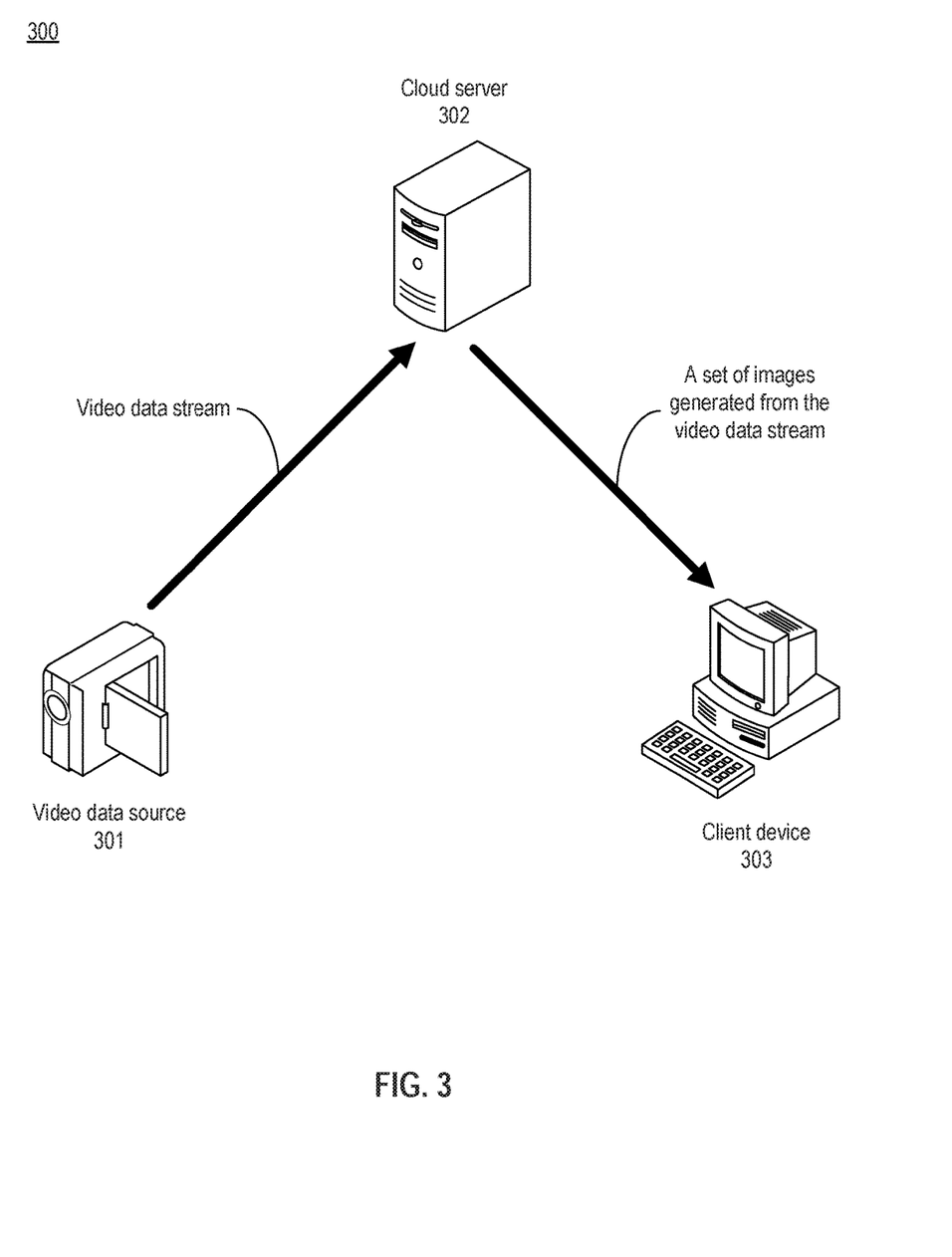
FIG. 3 is a block diagram illustrating an exemplary system for transmitting video data, consistent with embodiments of the present disclosure.

Reference is now made to FIG. 3, which illustrates an exemplary system 300 for transmitting of video data, according to embodiments of the present disclosure. As shown in FIG. 3, system 300 includes a video data source 301, a cloud server 302, and a client device 303. Although FIG. 3 illustrates that the video data source is external to the cloud server, it is understood that the video data source can also be a device internal to the cloud server. For example, the video data source can be a storage device that stores a video data file, and provides the video data file to a processor of the cloud server.

Cloud server 302 can receive encoded video data stream from video data source 301, decode the video data stream, and generate a set of images per unit time of the video data stream. For example, the cloud server may convert one second worth of video data into 24 images. Cloud server 302 can then transmit the images to client device 303. The images can be rendered and displayed by a browser program installed on the client device to simulate the effect of playing a video clip.

Figure 4:
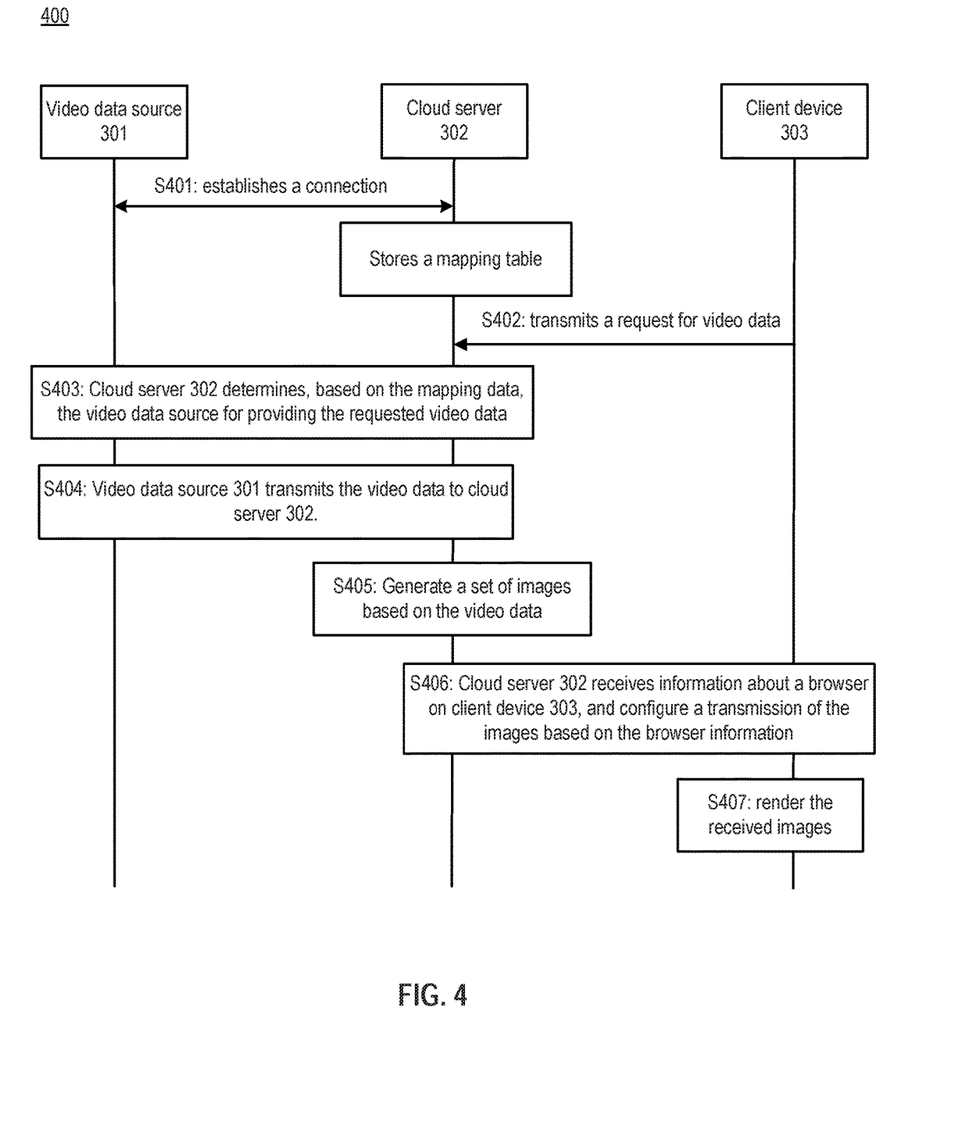
FIG. 4 is a flow chart illustrating an exemplary method for transmitting video data, consistent with embodiments of the present disclosure.

Reference is now made to FIG. 4, which illustrates an exemplary method 400 for transmitting video data, according to embodiments of the present disclosure. The method can be performed by, for example, a video data source 301, a cloud server 302, and/or a client device 303. Referring to FIG. 4, method 400 includes the following steps.

In step S401, video data source 301 (e.g., a video camera, a monitoring device, a storage device, etc.) establishes a connection with cloud server 302. The connection can be formed over a network, or over any hardware interface between the video data source and the cloud server (e.g., if the video data source is a hard drive of the cloud server). In a case where video data source 301 is external to cloud server 302, cloud server 302 may also authenticate the identity of video data source 301. Cloud server 302 may also maintain a mapping table that maps between identified video data sources and video data, as well as other data (e.g., certificate, keys, cookies, etc.) used for maintaining the connection with the video data sources.

In step S402, cloud server 402 receives, from client device 403, a request for video data. The request can be generated from a browser of the client device (e.g., when a user browses a web page and clicks on a video link).

In step S403, based on the mapping data, cloud server 302 can determine the video data source for providing the requested video data, and forward the request to the video data source (e.g., video data source 301) for the video data. In some embodiments, cloud server 302 can also authenticate the client device and reject any unauthorized requests, to provide secure access to the video data.

In step S404, after receiving the request for video data from cloud server 302, video data source 301 can transmit the video data to cloud server 302. In a case where video data source 301 is separated from cloud server 302 by a network, video data source 301 may use any suitable protocol, such as the Real-time Transport Protocol (RTP), to transmit the video data to cloud server 302.

In step S405, after cloud server 302 receives the video data, cloud server 302 can determine the compression format associated with the video data (e.g., H.264, Motion JPEG, etc.), and then decode the video data accordingly to generate a set of images. The generation of the images can be based on one or more conversion rules, which can also define the format of the images (e.g., JPEG).

In step S406, cloud server 302 receives information about a browser installed at client device 303, and then configures a transmission of the set of images to client device 303 based on the browser information. As an illustrative example, if the browser supports WebSocket (e.g., Google Chrome 14.0, Microsoft Internet Explorer 9, Apple Safari 5.1, etc.), the transmission of the images can be based on the requirements of WebSocket. As another illustrative example, the transmission of the set of images can be based on Comet, such that cloud server can push the image data to the browser without the browser explicitly requesting the data. It is understood that the cloud server may configure the transmission in any appropriate fashion, such that the browser can render the images in an order that simulates the effect of playing a video clip.

In step S407, after receiving the images, the client device can provide the images to the browser, which can then render the images. For example, an image of the images can be associated with the HTML5 <canvas> tags and a set of instructions written in JavaScripts for image rendering. Based on the association with the <canvas> tags, the browser can then execute the JavaScript to render the image, as well as the rest of images, to simulate the effect of playing a video clip.

Figure 5:
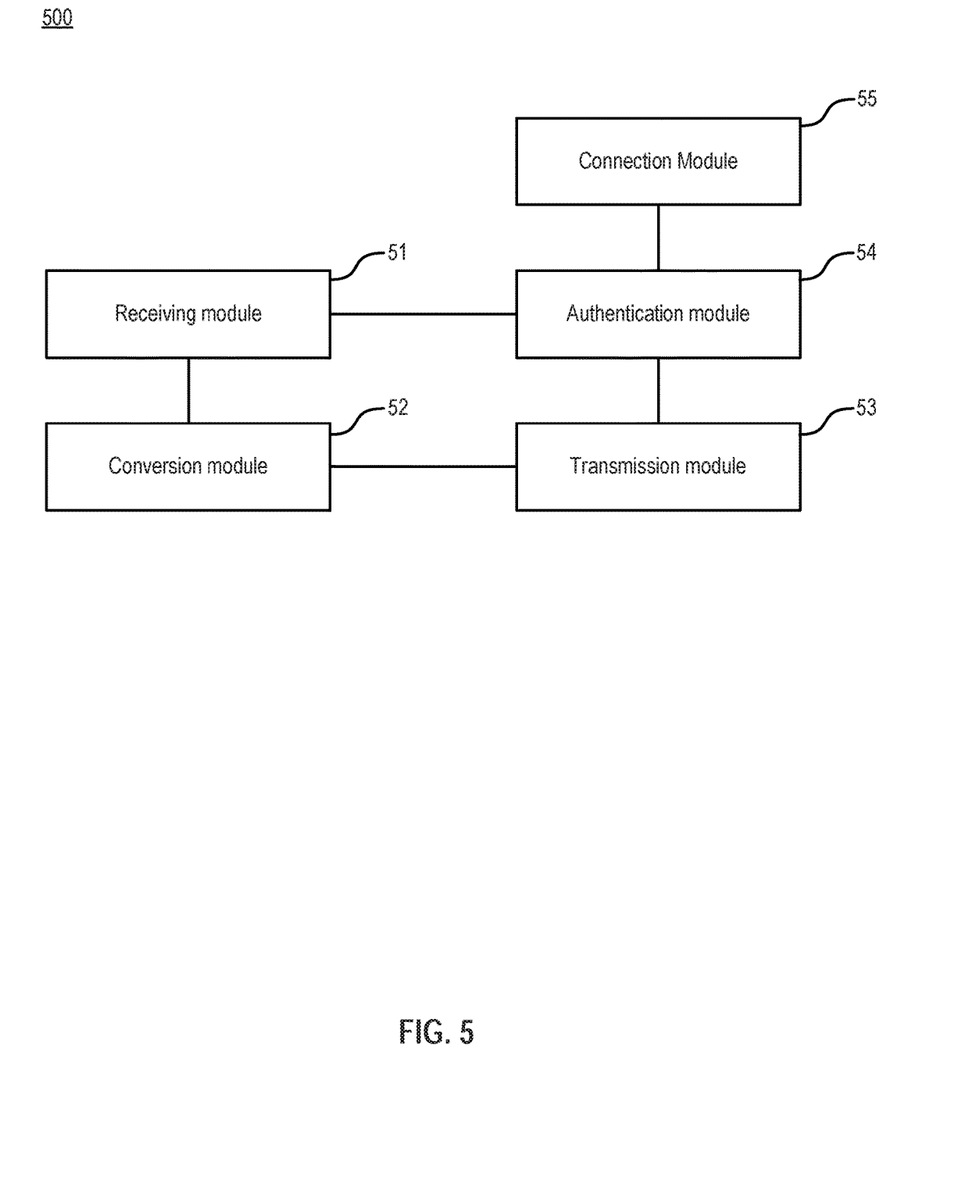
FIG. 5 is a block diagram illustrating an exemplary system for transmitting video data, consistent with embodiments of the present disclosure.

Reference is now made to FIG. 5, which illustrates a server 500 for transmitting video data, according to embodiments of the present disclosure. In some embodiments, server 500 can be configured as cloud server of FIG. 3. As shown in FIG. 5, server 500 includes a receiving module 51, a conversion module 52, a transmission module 53, an authentication module 54, and a connection module 55. Server 500 can be configured to perform at least some of the steps of method 200 of FIG. 2 and of method 400 of FIG. 4.

For the purposes of this disclosure, it is appreciated that each of these modules (and any corresponding sub-modules) can be packaged functional hardware unit designed for use with other components (e.g., portions of an integrated circuit) and/or a part of a program (stored on a computer readable medium) that performs a particular function of related functions. For example, if the disclosed "modules" are implemented in software, they may be stored in a memory associated with system 500. Processors, I/O devices, and memory devices may be used to perform processes to implement and facilitate operations of the modules. Thus, the modules may include code instructions executable by one or more processors, alone or in various combinations with other modules disclosed in this or other embodiments. If the disclosed "modules" are implemented in hardware, they may comprise an embedded system or other dedicated hardware configured by machine code, assembly code, or the like to interact with other modules to perform functions consistent with disclosed embodiments.

In some embodiments, receiving module 51 is configured to receive a video data stream from a video data source (e.g., video data source 302 of FIG. 3). Receiving module 51 may also receive and process a connection request from the video data source, and receive and process a request for video data from a client device (e.g., client device 303 of FIG. 3). In some embodiments, receiving module 51 is configured to perform, for example, step S201 of FIG. 2.

In some embodiments, conversion module 52 is configured to convert the video data stream received by the receiving module 51 into a set of images. The conversion can be based on one or more conversion rules that corresponds to a playback video quality. The conversion rules can specify a number of images to be generated per unit time of the video data stream. The number of images to be generated per unit time can be set based on, for example, a request from a client device (e.g., client device 303 of FIG. 3), network load, a perceived playback quality, etc. In some embodiments, conversion module 52 is configured to perform, for example, step S202 of FIG. 2 and S405 of FIG. 3.

In some embodiments, transmission module 53 is configured to transmit the set of images generated by conversion module 52 to the client device for rendering and displaying. In some embodiments, transmission module 53 is configured to acquire browser information of the client device and configure the transmission of images according to the browser information. In some embodiments, transmission module 53 is also configured to forward a request for video data from the video data source after receiving the request from the client device. In some embodiments, transmission module 53 is configured to perform, for example, step S203 of FIG. 2 and step S406 of FIG. 4.

In some embodiments, authentication module 54 is configured to authenticate the identities of the client device and the cloud server, before granting the client device access to the video data stored at the video data source. For example, authentication module 54 can authenticate the identity of the client device after receiving a request for video data from the client device, and cause transmission module 53 to forward the request to the video data source after authenticating the identity of the client device. Also, authentication module 54 can authenticate the identity of the video data source after receiving the connection request from the video data source, and can forward the request to the video data source after authenticating the identity of the video data source.

In some embodiments, connection module 55 is configured to establish and maintain a connection with the video data source, after authentication module 54 authenticates the identity of the video data source.

Figure 6:
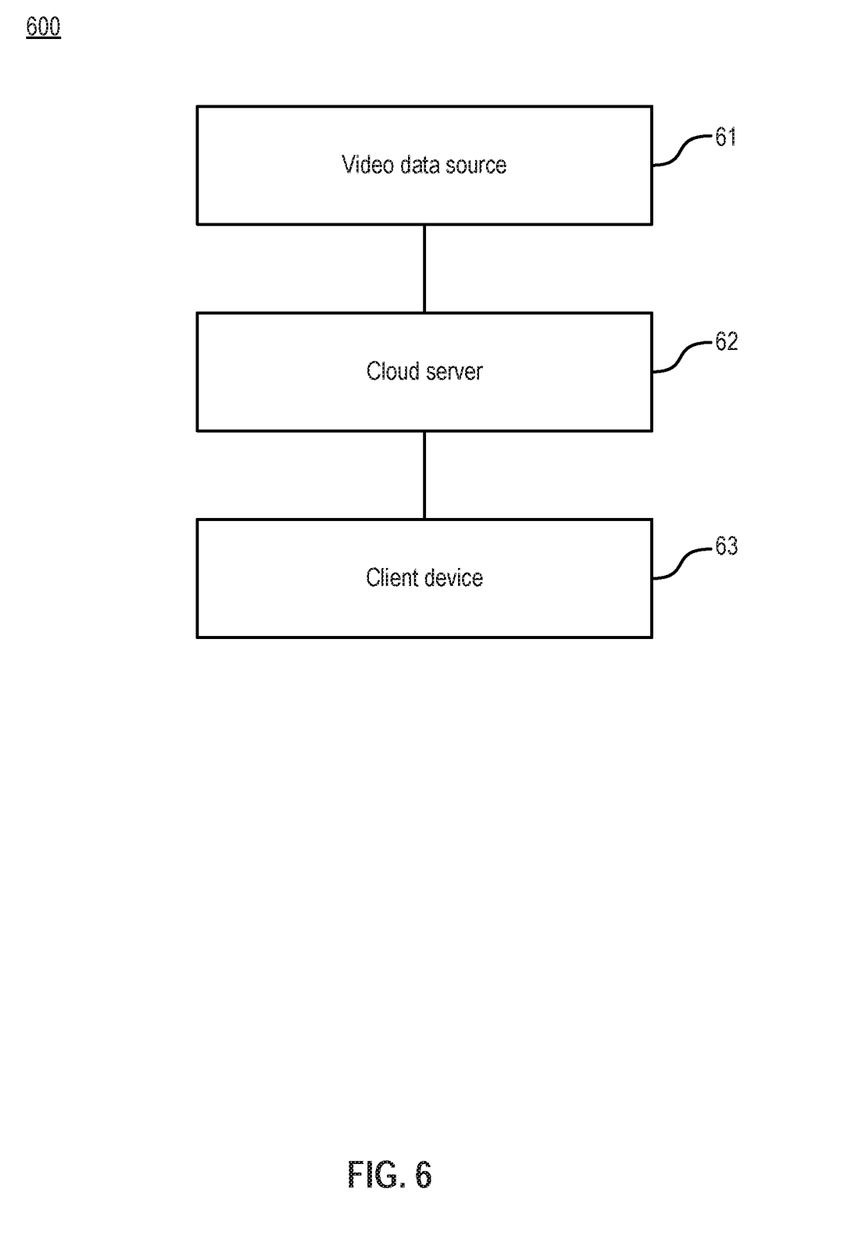
FIG. 6 is a block diagram illustrating an exemplary system for transmitting video data, consistent with embodiments of the present disclosure.

Reference is now made to FIG. 6, which illustrates a system 600 for transmitting video data, according to embodiments of the present disclosure. As shown in FIG. 6, system 600 includes a video data source 61, a cloud server 62, and a client device 63. In some embodiments, video data source 61, cloud server 62, and client device 63 are configured to perform the functionalities of, respectively, video data source 301, cloud server 302, and client device 303 of FIG. 3, and to perform at least some steps of method 200 of FIG. 2 and of method 400 of FIG. 4. For example, cloud server 62 can receive encoded video data stream from video data source 61, decode the video data stream, and generate a set of images per unit time of the video data stream. Cloud server 62 can then transmit the images to client device 63. The images can be rendered and displayed by a browser program installed on the client device to simulate the effect of playing a video clip.

The present disclosure may be described in a general context of computer-executable commands or operations, such as a program module, stored on a computer readable medium and executed by a computing device or a computing system, including at least one of a microprocessor, a processor, a central processing unit (CPU), a graphical processing unit (GPU), etc. In general, the program module may include routines, procedures, objects, components, data structures, processors, memories, and the like for performing specific tasks or implementing a sequence of steps or operations.

The present disclosure may also be implemented in a distributed computing environment, and in these distributed computing environments, tasks or operations may be executed by a remote processing device connected through a communication network, e.g., the Internet. In the distributed computing environment, the program module may be located in a local or a remote non-transitory computer-readable storage medium, including a flash disk or other forms of flash memory, a Read-Only Memory (ROM), a Random Access Memory (RAM), a magnetic disk, an optical disk, a cache, a register, etc.

Furthermore, although aspects of the disclosed embodiments are described as being associated with data and/or instructions stored in a memory and/or other tangible and/or non-transitory computer-readable mediums, it would be appreciated that these data and/or instructions can also be stored on and executed from many types of tangible computer-readable storage medium, such as storage devices, including hard disks, floppy disks, or CD-ROM, or other forms of RAM or ROM. Accordingly, the disclosed embodiments are not limited to the above-described examples, but instead is defined by the appended claims in light of their full scope of equivalents.

Embodiments of the present disclosure may be embodied as a method, a system, a computer program product, etc. Accordingly, embodiments of the present disclosure may take the form of an entirely hardware embodiment, an entirely software embodiment, or an embodiment combining software and hardware for allowing a specialized device having the described specialized components to perform the functions described above. Furthermore, embodiments of the present disclosure may take the form of a computer program product embodied in one or more computer-readable storage media that may be used for storing computer-readable program codes.

Embodiments of the present disclosure are described with reference to flow charts and/or block diagrams of methods, devices (systems), and computer program products. It will be understood that each flow chart and/or block diagram can be implemented by computer program instructions. These computer program instructions may be provided to a processor of a special-purpose computer, an embedded processor, or other programmable data processing devices or systems to produce a machine or a platform, such that the instructions, when executed via the processor of the computer or other programmable data processing devices, implement the functions and/or steps specified in one or more flow charts and/or one or more block diagrams.

The computer-readable storage medium may refer to any type of non-transitory memory on which information or data readable by a processor may be stored. Thus, a computer-readable storage medium may store instructions for execution by one or more processors, including instructions for causing the processor(s) to perform steps or stages consistent with the embodiments described herein. The computer-readable medium includes non-volatile and volatile media, removable and non-removable media. The information and/or data storage can be implemented with any method or technology. Information and/or data may be modules of computer-readable instructions, data structures, and programs, or other types of data. Examples of a computer-readable storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a cache, a register, a compact disc read-only memory (CD-ROM), a digital versatile disc (DVD) or other optical storage, a cassette tape, tape or disk storage, or other magnetic storage devices, or any other non-transitory media that may be used to store information capable of being accessed by a computer device.

It should be noted that, the relational terms such as "first" and "second" are only used to distinguish an entity or operation from another entity or operation, and do necessarily require or imply that any such actual relationship or order exists among these entities or operations. It should be further noted that, as used in this specification and the appended claims, the singular forms "a," "an," and "the," and any singular use of any word, include plural referents unless expressly and unequivocally limited to one referent. As used herein, the terms "include," "comprise," and their grammatical variants are intended to be non-limiting, such that recitation of items in a list is not to the exclusion of other like items that can be substituted or added to the listed items.

Those skilled in the art may understand that the accompanying drawing is merely a schematic diagram of an exemplary implementation scenario, and the modules or processes in the accompanying drawing are not necessarily mandatory to the embodiments of the present invention.

Those skilled in the art may understand that the modules in the apparatus in the implementation scenario may be distributed in the apparatus of the implementation scenario according to the description of the implementation scenario, or may be changed correspondingly and located in one or more apparatuses in other different implementation scenarios. The modules in the foregoing implementation scenario may be combined into one module, or further divided into multiple sub-modules.

The sequence numbers of the foregoing embodiments of the present invention are merely for the convenience of description, and do not imply the preference among the implementation scenarios.

Disclosed above are merely several specific implementation scenarios of the embodiments of the present invention, but the embodiments of the present invention are not limited thereto. Any variation readily figured out by those skilled in the art shall fall within the protection scope of the present invention.

What is claimed is:

1. A method for transmitting video data over a network, the method comprising:
   receiving, from a video data source, video data;
   decoding the received video data;
   generating a set of images from the decoded video data based on a conversion rule that corresponds to a predetermined playback video quality, wherein the conversion rule is set by setting the conversion rule to define a first number of images to be generated per unit time of the video data based on a requisite playback video quality at a client device and by updating the first number defined in the conversion rule based on a status of the network; and
   transmitting, over the network to the client device, the set of images for rendering and displaying on a browser installed on the client device.

2. The method of claim 1, further comprising:
   receiving, from the client device, a request for video data;
   authenticating the client device;
   after authenticating the client device, forwarding the request for video data to the video data source.

3. The method of claim 1, further comprising:
   receiving, from the video data source, a connection request;
   authenticating the video data source;
   after authenticating the video data source; establishing a connection with the video data source, and storing information that maps the video data source to the video data.

4. The method of claim 1, further comprising:
   receiving first information for setting the conversion rule, the information including at least one of: the status of the network, and the requisite video playback quality at the client device; and
   setting the conversion rule based on the first information.

5. The method of claim 1, further comprising:
   receiving second information of a browser on the client device for rendering the set of images; and
   configuring the transmission of the set of images to the client device based on the second information.

6. An apparatus for transmitting video data over a network, the apparatus comprising:
   a memory storing a set of instructions; and
   one or more processors configured to execute the set of instructions to cause the apparatus to perform:
   receiving, from a video data source, video data;
   decoding the received video data;
   generating a set of images from the decoded video data based on a conversion rule that corresponds to a predetermined playback video quality, wherein the conversion rule is set by setting the conversion rule to define a first number of images to be generated per unit time of the video data based on a requisite playback video quality at a client device and by updating the first number defined in the conversion rule based on a status of the network; and
   transmitting over the network to the client device, the set of images for rendering and displaying on a browser installed on the client device.

7. The apparatus of claim 6, wherein the one or more processors are configured to execute the set of instructions to cause the apparatus to further perform:
   receiving from the client device, a request for video data;
   authenticating the client device; and
   after authenticating the client device, forwarding the request for video data to the video data source after the client device is authenticated.

8. The apparatus of claim 6, wherein the one or more processors are configured to execute the set of instructions to cause the apparatus to further perform:
   receiving from the video data source, a connection request;
   authenticating the video data source;
   after authenticating the client device, establishing a connection with the video data source; and
   storing information that maps the video data source to the video data.

9. The apparatus of claim 6, wherein the one or more processors are configured to execute the set of instructions to cause the apparatus to further perform:
   receiving first information for setting the conversion rule, the information including at least one of: the status of the network, and the requisite video playback quality at the client device; and
   setting the conversion rule based on the first information.

10. The apparatus of claim 6, wherein the one or more processors are configured to execute the set of instructions to cause the apparatus to further perform:
    receiving second information of a browser on the client device for rendering the set of images; and
    configuring the transmission of the set of images to the client device based on the second information.

11. The apparatus of claim 6, wherein the video data is received from the video data source over the network.

12. A non-transitory computer-readable storage medium that stores a set of instructions that is executable by at least one processor of a server to cause the server to perform a method for transmitting video data over a network, the method comprising:

receiving, from a video data source, video data;

decoding the received video data;

generating a set of images from the decoded video data based on a conversion rule that corresponds to a predetermined playback video quality, wherein the conversion rule is set by setting the conversion rule to define a first number of images to be generated per unit time of the video data based on a requisite playback video quality at a client device and by updating the first number defined in the conversion rule based on a status of the network; and transmitting, over the network to the client device, the set of images for rendering and displaying on a browser installed on the client device.

13. The medium of claim 12, wherein the set of instructions that is executable by the at least one processor of the server to cause the server to further perform:

receiving first information for setting the conversion rule, the information including at least one of: the status of the network, and the requisite video playback quality at the client device; and setting the conversion rule based on the first information.

14. The medium of claim 12, wherein the set of instructions that is executable by the at least one processor of the server to cause the server to further perform:

receiving second information of a browser on the client device for rendering the set of images; and configuring the transmission of the set of images to the client device based on the second information.

* * * * *